March 3, 1970  H. BAUMANN ET AL  3,498,686

ARRANGEMENT FOR ABSORBING AXIAL THRUST OF A TURBOMACHINE SHAFT

Filed Nov. 27, 1967  4 Sheets-Sheet 1

INVENTORS
Hans Baumann
Walter Enz

Pierce, Scheffler & Parker
Attorneys

INVENTORS
Hans Baumann
Walter Enz

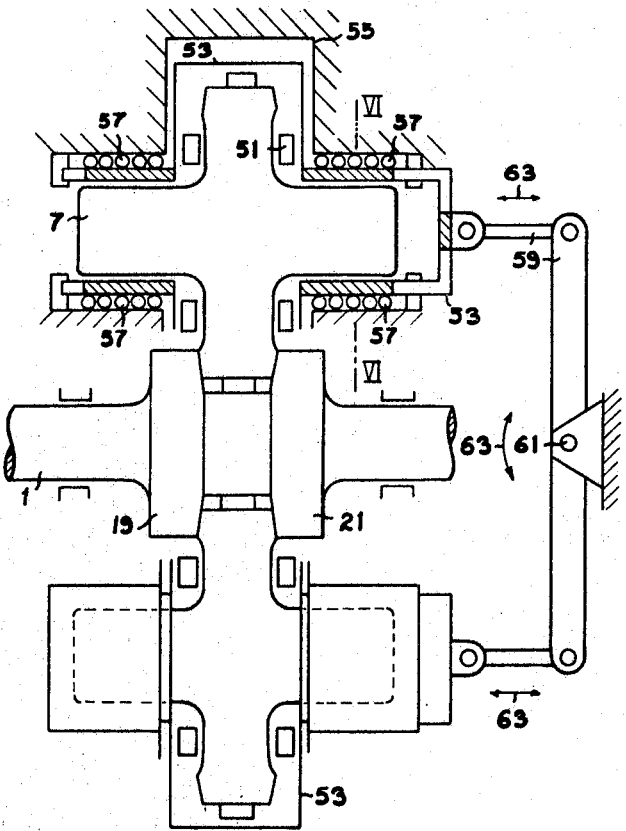
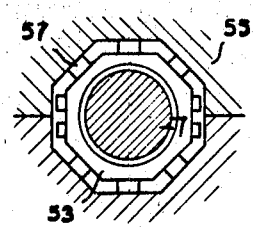
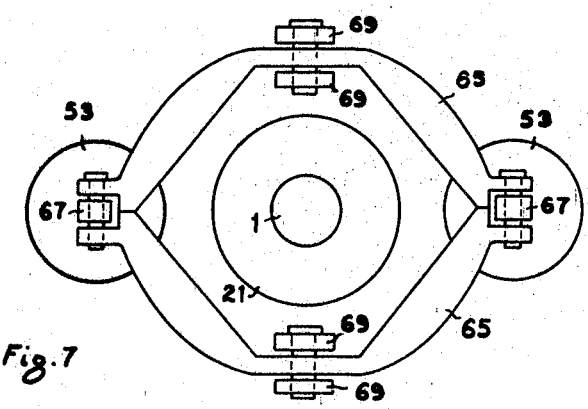

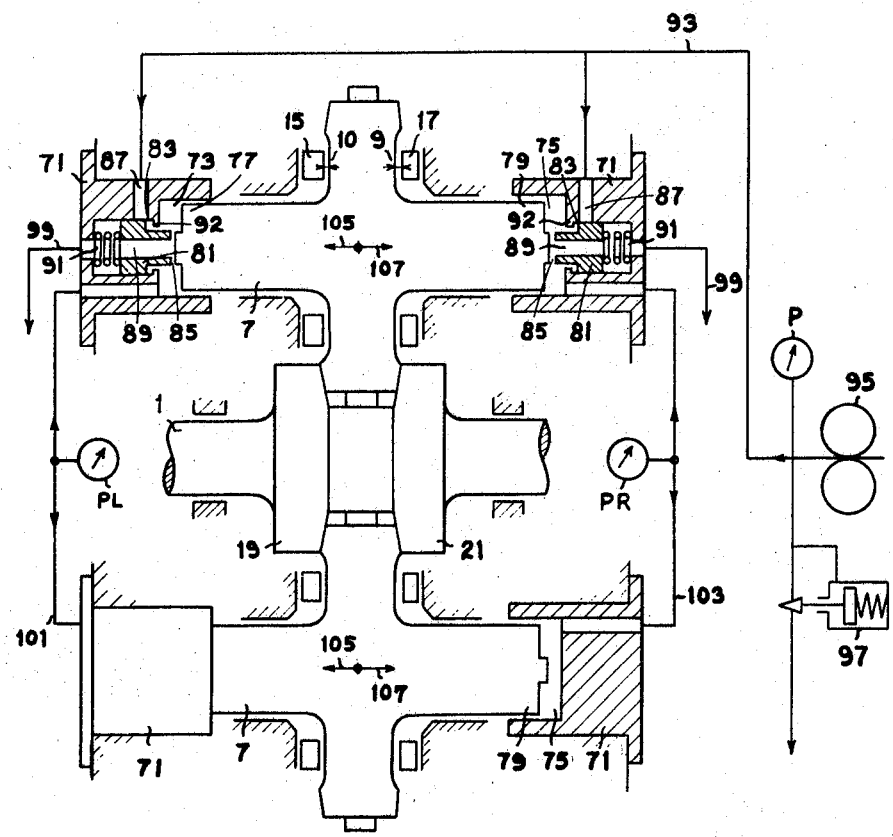

United States Patent Office 3,498,686
Patented Mar. 3, 1970

3,498,686
ARRANGEMENT FOR ABSORBING AXIAL
THRUST OF A TURBO-MACHINE SHAFT
Hans Baumann, Nussbaumen, and Walter Enz, Wettingen, Switzerland, assignors to Aktiengesellschaft Brown, Boveri & Cie, Baden, Switzerland, a joint-stock company
Filed Nov. 27, 1967, Ser. No. 685,914
Claims priority, application Switzerland, Dec. 30, 1966, 18,856/66
Int. Cl. F16c 17/04, 17/10, 19/04
U.S. Cl. 308—135                      6 Claims

ABSTRACT OF THE DISCLOSURE

An arrangement for taking up the axial thrust imposed upon the shaft of a turbo-machine comprises at least one auxiliary shaft located parallel with and to one side of the turbo-machine shaft and which is driven by the latter at a reduced speed. Any axial thrust imposed upon the turbo-machine shaft is transmitted to the auxiliary shaft and is absorbed by axially acting thrust bearings associated with the latter.

---

The present invention relates to an improved arrangement for taking up, i.e. absorbing the axial thrust acting on the power-transmitting high-speed shaft of a turbo-machine.

It is customary for the residual thrust which acts on the blading of a turbo-machine in consequence of pressure-difference, and which cannot be equalized, to be taken up by an axial-thrust bearing arranged on the rotor. Such bearings are known in various structural embodiments. However, the load capacity of known axial-thrust bearings is limited, since at high speeds the bearing size cannot be increased to any extent which may be desired. In addition, bearing losses increase sharply at high speeds. It must also be expected that large bearings will be considerably less reliable at high speeds.

The object of the present invention is to avoid the cited disadvantages of known arrangements with axial-thrust bearings.

According to the invention, the arrangement is characterized in that there is at least one auxiliary shaft, not carrying power output and provided with axial-thrust bearings, which is driven at reduced speed from the shaft of the turbo-machine by a synchronizing toothed-wheel transmission, to which auxiliary shaft the axial thrust acting on the power-transmitting turbo-machine shaft is transmitted by means of at least one pressure-collar fitted to the turbo-machine shaft and rotating therewith.

Figure 1:
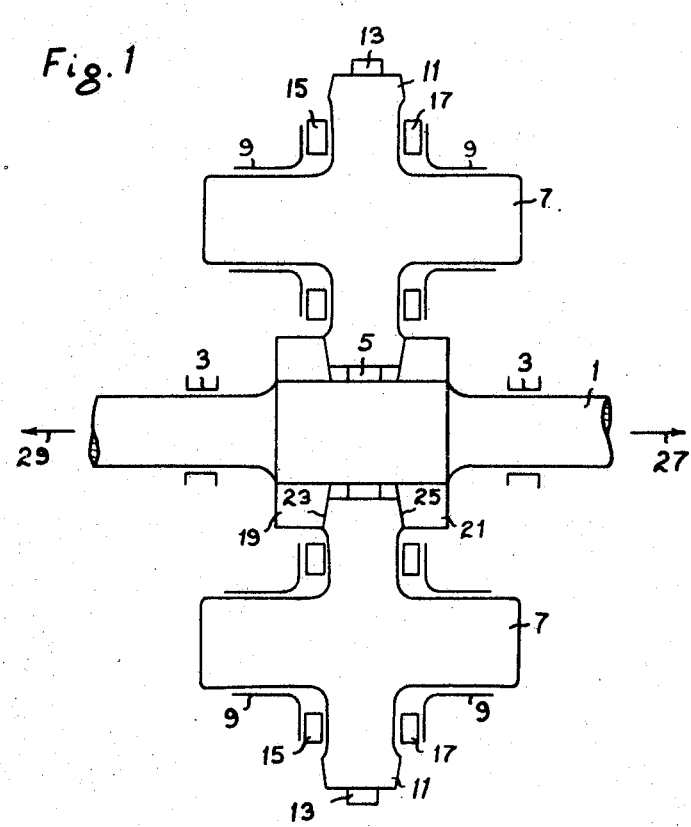
Figure 2A:
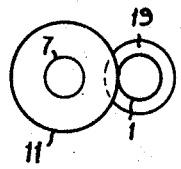
Figure 2B:
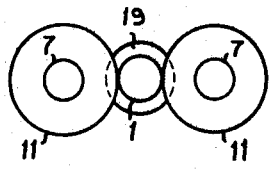
Figure 2C:
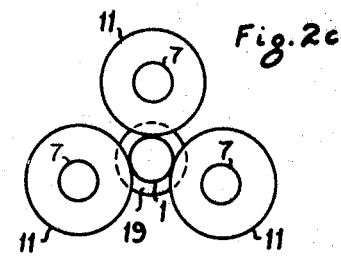
Figure 3:
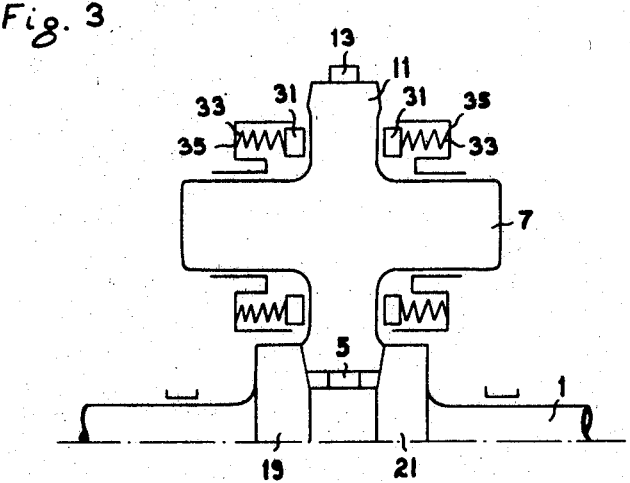
Figure 4:
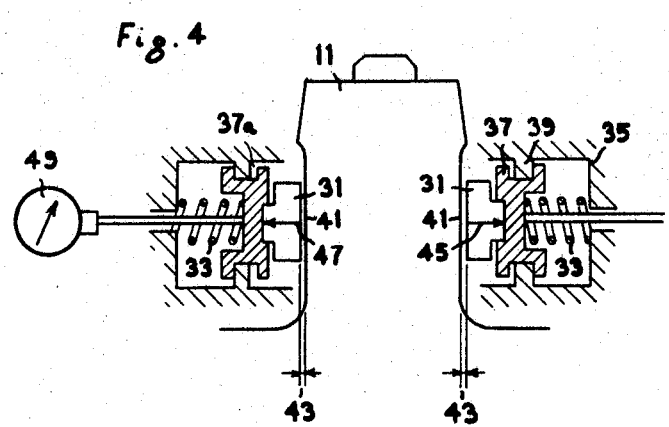

The invention will be explained hereinafter by way of example with the aid of the accompanying drawings, wherein:

FIG. 1 shows in a diagrammatic manner one embodiment according to the principle of the invention wherein two auxiliary shafts are provided, FIGS. 2a to 2c show the arrangement in diagrammatic end elevation, with one, two or three auxiliary shafts, FIG. 3 shows in diagrammatic fashion an embodiment similar to that of FIGURE 1, with sprung bearing elements, FIG. 4 shows details of sprung bearing elements from FIGURE 3, FIG. 5 shows a further embodiment with mechanical equalization of the thrust take-up, FIG. 6 shows a section along the line VI—VI in FIGURE 5, FIG. 7 shows an end elevation of the mechanical equalizer device of FIGURE 5, and FIGURE 8 shows a further embodiment with hydrostatic equalization of the thrust take-up.

With reference now to FIG. 1, a shaft 1 of a turbo-machine supported in radial bearings 3 is provided with a ring gear 5, and drives two auxiliary shafts 7 carried in their own radial bearings 9 and located to each side of shaft 1. For driving purposes, each auxiliary shaft 7 is fitted with a wheel member 11 provided with a ring gear 13 on its periphery meshing with ring gear 5 on the machine shaft 1. The transmission from the machine shaft 1 to the auxiliary shafts 7 involves a speed-reduction, for example in a ratio from 2:1 to 4:1. The auxiliary shafts 7 are axially retained by axial-thrust bearings 15 and 17 arranged on both sides of the wheel members 11, which are made in the form of ridged discs.

For transmission of the axial thrust from the turbo-machine shaft 1 to the auxiliary shafts 7 and thus to the axial-thrust bearings 15 and 17, shaft 1 is fitted with two pressure-collars 19 and 21 which rotate with it and are fast with it. The pressure-collars 19 and 21 and the outer portion of wheel member 11 include faces 23 and 25 which bear against one another, and whereof the radial position corresponds for example approximately to the pitch-circle diameter of the gears 5, 13. The turbo-machine shaft 1 bears axially by means of the pressure-collars 19, 21, via the faces 23 or 25, against the wheel members 11 on the auxiliary shafts 7, and thus against the axial-thrust bearings 17 or 15, according to whether the direction of thrust coincides with the direction of the arrow 27 or the arrow 29.

There are furthermore lubricators, not illustrated in FIG. 1, in order to provide the faces 23, 25 of the pressure-collars 19, 21 and of the wheel members 11 with carrier layers of lubricant. The faces may in intrinsically known manner be tapered, as illustrated, with the result that the lubricant is forced into the pressure zone in the form of a lubricating wedge.

The axial thrust of the high-speed shaft 1 is transmitted in the arrangement described and illustrated via the pressure-collars 19, 21 to the considerably slower-running synchronously driven auxiliary shafts 7, and can there be taken up by ordinary large axial-thrust bearings 15, 17 (collar-bearings) without there being any fear of heavy bearing-losses or liability to damage on account of high speed. No power from the machine is transmitted by the auxiliary shafts so that the pressure-collars 19, 21 can reliably transmit large axial forces in the minimum space as a result of the low sliding velocities prevailing on their faces 23, 25 and to the lubricating wedges present, that is to say hydrodynamic lubricating conditions, and no special requirements have to be imposed on the drive to the auxiliary shafts 7 by the gears 5, 13.

The arrangement described may be used with one or more coupled turbo-machines, and may take the form of a separate unit coupled between the machines, or may be structurally incorporated in them.

According to the diagrammatic illustration of FIGS. 2a to 2c, one or more auxiliary shafts 7 as desired may be associated with the shaft 1 for the purpose of transmitting axial thrust from the latter via pressure-collars 19 and 21 to wheel members 11 fast with auxiliary shafts 7. In FIG. 2a there is a single auxiliary shaft 7, in FIG. 2b two auxiliary shafts 7 are arranged as in FIGURE 1 with respect to the shaft 1, and in FIG. 2c there are three auxiliary shafts 7 located in equally spaced relation about the axis shaft 1.

The subsequent FIGS. 3 to 8 illustrate embodiments of the arrangement according to the invention which distribute the axial thrust at least substantially uniformly to two or more auxiliary shafts, with the result that the axial-thrust bearings of the auxiliary shafts are protected from overload.

According to FIG. 3, the partly illustrated turbo-machine shaft 1 drives the auxiliary shaft 7 via the meshed ring gears 5, 13 and the wheel member 11. Pressure-collars 19 and 21 fitted to the shaft 1 are again provided for the purpose of transmitting the axial thrust to the driven auxiliary shaft. At least one further auxiliary shaft (not illustrated) is arranged in the same manner parallel to the shaft 1.

The axial-thrust bearings for the auxiliary shaft 7 comprise axial-thrust-bearing elements 31 which are supported against a fixed bearing-housing piece 35 via compression springs 33. This individual springing of the axial-thrust-bearing elements 31 results in at least substantially uniform loading on all the elements 31 in each case on one side of the wheel member 11 in the form of a ridged disc.

Details of an individual springing unit for the axial-thrust-bearing elements 31 may be seen from FIG. 4. In the embodiment illustrated in this view, each of the axial-thrust-bearing elements 31 at opposite sides of the wheel body 11 is fitted to and bears against one side of an annular disc 37 which has a grooved periphery in which is received a circular shoulder 39 which extends radially inward from the bearing housing. The width of shoulder 39 is somewhat narrower than the width of the groove 37a so as to enable the disc 37 to have a slight amount of axial movement. A compression spring 33 is interposed between a fixed part of the bearing housing and the opposite side of disc 37. This arrangement establishes a normal axial play 43 between the running surfaces of the axial-thrust-bearing elements 31 and the running surfaces 41 of the ridged disc 11. If individual axial-thrust-bearing elements 31 are too heavily loaded as a result of inaccuracies in dimensions and processing, these elements yield resiliently in the direction of the arrows 45 and 47. This in turn results in at least substantially uniform loading on all the elements 31 on one side of the member 11. If the total axial loading exceeds a quantity predetermined by the bias of the springs 33, all the axial-thrust-bearing elements on one side of the wheel member 11 yield resiliently together. In this case, a contact device 49 operatively linked to the axial-thrust-bearing elements 31 can give a warning or shut off the turbo-machine.

FIGS. 5 to 7 illustrate a further form of embodiment of the arrangement with a mechanical equalizer device for thrust take-up by the axial bearings of the auxiliary shafts. The axial thrust of the shaft 1 is transmitted to two or more driven auxiliary shafts 7 via pressure-collars 19 and 21 in the manner already described. The axial-thrust-bearing elements 51 for the auxiliary shafts are accommodated in axial-thrust-bearing housings 53 which extend beyond the ends of the auxiliary shafts 7. The axial-thrust-bearing housings 53 are mounted in a thrust-bearing-block 55 so as to be capable of moving in the axial direction. For this purpose, the arrangement illustrated comprises trains of rollers 57 arranged between the external wall of each axial-thrust-bearing housing 53 and corresponding parts of the internal wall of the thrust-bearing-block 55 (FIGURES 5 and 6). Hydrostatic bearings may also be provided instead of the trains of rollers 57 illustrated.

Axial support is imparted to the axial-thrust-bearing housings 53 via an articulated lever system 59 which has a fixed pivot point 61 on the axis of the shaft 1, and which pivots in the directions illustrated by the arrows 63 if the housing 53 for the axial-thrust-bearings 51 move axially (FIG. 5). A form of embodiment of the articulated lever system 59 is illustrated in FIG. 7. The transverse part consists of two arcuate arms 65 articulated at their mutually linked ends to axial rods 67 which in turn are linked in articulated fashion to the axial-thrust-bearing housings 53 (FIG. 5). The mid-points of the arms 65 are mounted in articulated fashion in fixed carriers 69. The arcuate design illustrated for the arms 65 which surround shaft 1 prevents any interference with operation of the shaft.

The auxiliary shafts 7 in turn transmit to the axially movable axial-thrust-bearing housings 53, by means of the axial-bearing elements 51, the axial thrust taken up from the shaft 1 (FIG. 5) via the pressure-collars 19 and 21. The articulated lever system 59 linking the axial-thrust-bearing housings thus equalizes the thrust on the auxiliary shafts 7, an increase in bearing pressure acting only on one side of one auxiliary shaft 7 being equalized by a corresponding increase in bearing pressure on the other side of the other auxiliary shaft 7.

A further form of embodiment of the arrangement with hydrostatic equalization of thrust take-up by the auxiliary shafts is illustrated in FIG. 8. The pressure-collars 19 and 21 are provided as in the forms of embodiment already described for the purpose of transmitting the axial thrust of the turbo-machine shaft 1 to two or more driven auxiliary shafts 7. Pressure-cylinders 71 are arranged in fixed fashion at both ends of each auxiliary shaft 7, coaxially with the relevant auxiliary shaft 7. Each pressure-cylinder 71 comprises a pressure-space 73 (left-hand ends of the shafts) or 75 (right-hand ends of the shafts), in which the corresponding end 77 or 79 of a shaft 7 is disposed in the form of an axially displaceable piston.

In the pressure-cylinders 71 on one of the auxiliary shafts 7 there is furthermore an axially bored control piston 81 comprising an inflow-control edge 83 and a control surface 85. Axial movement of the control piston 81 causes the control edge 83 to open or close an inflow duct 87 for oil under pressure, which can pass into the pressure-space 73 or 75 when the duct 87 is open. When the control piston 81 is in one position, the control surface 85, by bearing against the end 77 or 79 of the shaft 7, seals off the pressure-space 73 or 75 from the axial bore 89 in the control piston 81. When the control piston 81 is in the lifted position, a gap links the pressure-space 73 or 75 to the bore 89 in the control piston 81. Each control piston 81 is additionally under axial pressure from a spring 91 which bears against the pressure-cylinder 71, and piston 81 is limited in its axial movement by an abutment 92.

In order to supply the pressure-spaces 73 and 75 with oil under pressure, the inflow duct 87 of each pressure-cylinder 71 is connected to an oil-pressure pipe line 93, to which oil is delivered under pressure from an oil-tank, not illustrated, by means of a pump 95. The pressure is kept constant at a value of $p$ by an overflow valve 97.

The axial bore 89 in each control piston 81 opens out into an oil-outlet pipe 99. Furthermore, the pressure-spaces 73 and 75 at the same ends 77 and 79 of the shafts are linked to one another by pipe lines 101 and 103, so that the same pressure $p_L$ prevails in both pressure-spaces 73, and the same pressure $p_R$, which may be different from the pressure $p_L$, in both pressure-spaces 75.

The mode of operation of the arrangement illustrated is as follows:

The oil-pressures $p_L$ and $p_R$ prevailing in the pressure-spaces 73 and 75 act on the faces of the ends 77 and 79 of the auxiliary shafts 7. The difference between the pressures $p_L$ and $p_R$ multiplied by the effective face area constitutes the force in opposition to the axial thrust which the auxiliary shafts 7 take up via the pressure-collars 19 or 21 from the shaft 1 in one axial direction or the other, indicated by the arrows 105 and 107. Since the left-hand pressure-spaces 73 are linked to one another, and so are the right-hand pressure-spaces 75, the force acting in opposition to the axial thrust is equal for all the auxiliary shafts 7, so that thrust-equalization is attained. If, for example, the auxiliary shafts 7 are now forced to the right in the direction of the arrow 107 by the pressure-collar 19, displacement of the auxiliary shafts closes the gap between each right-hand end 79 of a shaft and the control surface 85 of the control piston 81, with the result that the outlet of oil under pressure into the pipe 99 is shut off. The control piston 81 is pushed to the right by the end 79 of the shaft 7 and allows oil under pressure to flow via its control edge 83 from the feed pipe 93 into the pressure-space 75. As a result, the pressure $p_R$ rises, and exerts via the effective face area of the end 79 of the shaft 7 the opposing force to the acting axial thrust.

The reverse procedure takes place at the opposite ends 77 of the shafts. The control piston 81, following under pressure from the spring 91, closes the inflow duct 87 with its control edge 83, and comes to bear against the abutment 92. Displacement of the auxiliary shaft 7 to the right accordingly causes the face of the end 77 of the shaft to lift away from the control surface 85 of the control piston 81, so that oil under pressure can flow through the gap which is formed and through the bore 89 into the outlet pipe 99. The pressure $p_L$ in the pressure-space 73 becomes lower, which has the effect of displacing the auxiliary shaft 7 to the left in the direction of the arrow 105, as does the increase in the pressure $p_R$ which has been described.

The function served by the springs 91 is to cause the control piston 81 to follow the auxiliary shaft 7 as it moves. They additionally prevent oil under pressure from flowing out of the pressure-spaces 73 and 75 should there be a loss of pressure in the feed pipe 93, thus maintaining the pressure in these spaces.

In the arrangement described, the axial thrusts to be taken up by the auxiliary shafts 7 are taken up and equalized by hydrostatic means. The load capacity of these axial bearings is given by the pressure $p$ and the effective face area of the ends 77 and 79 of the shafts. In order that an additional safety limit may be available when the limiting load is approached, the axial-thrust bearings 15 and 17 already described may be provided. In this connection, the play 109 of these addition axial bearings 15 and 17 is advantageously set so that the axial bearings 15 and 17 come into action only when the control pistons 81 have traversed the path corresponding to the position of the control edges 83 and control surfaces 85.

We claim:
1. The combination with a high-speed power transmitting shaft of a turbo-machine of a bearing arrangement for taking up the axial thrust of said shaft in either direction which comprises:

at least two auxiliary and non-power transmitting shafts arranged parallel to and symmetrical with said turbo-machine shaft, each said auxiliary shaft being provided with a wheel member and a ring gear thereon, said turbo-machine shaft being provided with a collared portion including a pair of axially spaced faces contacting the opposite sides respectively of each of said wheel members on said auxiliary shafts for imparting axial thrust from said turbo-machine shaft to said auxiliary shafts, and a ring gear located between said axially spaced faces of said collared portion, said ring gear being meshed with and of smaller diameter than said ring gears on said wheel members for driving said auxiliary shafts at a speed lower than that of said turbo-machine shaft, axial thrust bearings correlated to each of said auxiliary shafts for absorbing the axial thrusts imparted to said auxiliary shafts in both directions by axial displacement of said turbo-machine shaft; and means effecting a yieldable loading of said thrust bearings against the auxiliary shafts and which serves to establish a substantially uniform distribution of the axial thrust from said turbo-machine shaft to said auxiliary shafts.

2. The combination with a high-speed power transmitting shaft of a turbo-machine of a bearing arrangement for taking up the axial thrust of said shaft in either direction which comprises:

at least two auxiliary and non-power transmitting shafts arranged parallel to and symmetrical with said turbo-machine shaft, each said auxiliary shaft being provided with a wheel member and a ring gear thereon, said turbo-machine shaft being provided with a collared portion including a pair of axially spaced faces contacting the opposite sides respectively of each of said wheel members on said auxiliary shafts for imparting axial thrust from said turbo-machine shaft to said auxiliary shafts, and a ring gear located between said axially spaced faces of said collared portion, said ring gear being meshed with and of smaller diameter than said ring gears on said wheel members for driving said auxiliary shafts at a speed lower than that of said turbo-machine shaft, axial thrust bearings for each of said auxiliary shafts and which are located respectively on opposite sides of each of said wheel members; and spring means individual to each of said thrust bearings for yieldingly loading said thrust bearings into contact with said wheel members thereby to effect a substantially uniform distribution of the axial thrust imparted to said auxiliary shafts from said turbo-machine shaft.

3. The combination with a high-speed power transmitting shaft of a turbo-machine of a bearing arrangement for taking up the axial thrust of said shaft in either direction which comprises:

at least two auxiliary and non-power transmitting shafts arranged parallel to and symmetrical with said turbo-machine shaft, each said auxiliary shaft being provided with a wheel member and a ring gear thereon, said turbo-machine shaft being provided with a collared portion including a pair of axially spaced faces contacting the opposite sides respectively of each of said wheel members on said auxiliary shafts for imparting axial thrust from said turbo-machine shaft to said auxiliary shafts, and a ring gear located between said axially spaced faces of said collared portion, said ring gear being meshed with and of smaller diameter than said ring gears on said wheel members for driving said auxiliary shafts at a speed lower than that of said turbo-machine shaft.

axial thrust bearings for each of said auxiliary shafts and which are located respectively on opposite sides of each of said wheel members, housings individual to and enclosing the axial thrust bearings correlated with each said auxiliary shaft, means mounting each of said bearing housings for axial movement along the appertaining auxiliary shafts; and an articulated lever system interlinking said bearing housings and which is arranged to rotate about a fixed pivot point such that axial displacement of the bearing housings correlated to one of said auxiliary shafts in one direction imparts axial displacement to the other bearing housings correlated to the other auxiliary shaft in the opposite direction thereby to effect a substantially uniform distribution of the axial thrust imparted to said auxiliary shafts from said turbo-machine shaft.

4. The combination as defined in claim 3 wherein said articulated lever system comprises arcuate like lever arms which encircle said turbo-machine shaft, each said lever arm being mounted intermediate the ends thereof for rotation about a fixed pivot, and the ends of said lever arms being connected to each other and to axially displaceable arms connected to said axial thrust bearing housings.

5. The combination with a high-speed power transmitting shaft of a turbo-machine of a bearing arrangement for taking up the axial thrust of said shaft in either direction which comprises:

at least two auxiliary and non-power transmitting shafts arranged parallel to and symmetrical with said turbo-machine shaft, each said auxiliary shaft being provided with a wheel member and a ring gear thereon, said turbo-machine shaft being provided with a collared portion including a pair of axially spaced faces contacting the opposite sides respectively of each of said wheel members on said auxiliary shafts for imparting axial thrust from said turbo-machine shaft to said auxiliary shafts, and a ring gear located between said axially spaced faces of said collared portion, said ring gear being meshed with and of smaller diameter than said ring gears on said wheel members for driving said auxiliary shafts at a speed lower than that of said turbo-machine shaft, axial thrust bearings for each end of each of said auxiliary shafts, each said thrust bearing being constituted by a piston formed at the end of the auxiliary shaft and a cylinder fixed as to position, means for pressurizing the interior of said cylinders so as to apply pressure against the end faces of the pistons therein; and pressure-equalizing pipe means interconnecting the pressure spaces within the cylinders at the same ends of said auxiliary shafts thereby to effect uniform distribution of the axial thrust imparted to said auxiliary shafts from said turbo-machine shaft.

6. The combination as defined in claim 5 wherein each said cylinder also includes a control valve therein and which is actuated by axial displacement of the auxiliary shaft correlated therewith, said control valve serving to control the fluid pressure within said cylinder such that any axial displacement of an auxiliary shaft is accompanied by an increase in the fluid pressure in one cylinder located at one end of said auxiliary shaft and a simultaneous decrease in fluid pressure in the cylinder located at the opposite end of the same auxiliary shaft, said increase in pressure serving to oppose axial displacement of said auxiliary shaft.

References Cited

UNITED STATES PATENTS

| 2,947,580 | 8/1960 | Fisher | 308—203 |
| 66,474 | 7/1967 | Dotterer | 308—203 |

MARTIN P. SCHWADRON, Primary Examiner

F. SUSKO, Assistant Examiner

U.S. Cl. X.R.

308—160